United States Patent
Hawley

(10) Patent No.: US 12,447,970 B2
(45) Date of Patent: Oct. 21, 2025

(54) DOWNHILL TARGET SPEED ACCELERATION CONTROL SYSTEMS AND METHODS

(71) Applicant: TOYOTA MOTOR ENGINEERING & MANUFACTURING NORTH AMERICA, INC., Plano, TX (US)

(72) Inventor: Thomas S. Hawley, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 269 days.

(21) Appl. No.: 18/160,035

(22) Filed: Jan. 26, 2023

(65) Prior Publication Data
US 2024/0253639 A1    Aug. 1, 2024

(51) Int. Cl.
*B60W 30/188*    (2012.01)
*B60W 10/04*    (2006.01)
(Continued)

(52) U.S. Cl.
CPC .......... *B60W 30/188* (2013.01); *B60W 10/04* (2013.01); *B60W 30/143* (2013.01); *B60W 40/12* (2013.01); *B60W 50/14* (2013.01); *B60T 2201/04* (2013.01); *B60W 2510/18* (2013.01); *B60W 2520/00* (2013.01)

(58) Field of Classification Search
CPC .. B60W 30/188; B60W 30/14; B60W 30/143; B60W 30/146; B60W 30/18; B60W 30/18009; B60W 30/18072; B60W 30/18109; B60W 30/18145; B60W 30/18181; B60W 30/182; B60W 10/04; B60W 10/06; B60W 10/08;
(Continued)

(56) References Cited

U.S. PATENT DOCUMENTS 6,249,735 B1 * 6/2001 Yamada ................ B60W 10/18
701/65
6,349,253 B1 * 2/2002 Bellinger ........ B60W 30/18136
477/115
(Continued)

FOREIGN PATENT DOCUMENTS

CN    110775038 A  *  2/2020    ............. B60T 17/22
CN    114590233 A      6/2022
(Continued)

*Primary Examiner* — Ramya P Burgess
*Assistant Examiner* — Sara J Lewandroski
(74) *Attorney, Agent, or Firm* — HAYNES AND BOONE, LLP

(57) ABSTRACT

Systems and methods related to downhill target speed acceleration control are provided. A powertrain torque control system includes a logic device configured to detect a braking behavior to set a target speed of a vehicle to descend downgrade. The logic device is further configured to activate a downhill speed control of the vehicle based on the detected braking behavior. The downhill speed control may include applying powertrain torque feedback to limit an acceleration of the vehicle to hold the target speed of the vehicle while descending downgrade. Associated methods and vehicles are also provided.

18 Claims, 4 Drawing Sheets

(51) Int. Cl.
*B60W 30/14* (2006.01)
*B60W 40/12* (2012.01)
*B60W 50/14* (2020.01)

(58) Field of Classification Search
CPC ..... B60W 2030/18081; B60W 2510/18; B60T 2201/04
See application file for complete search history.

(56) References Cited

U.S. PATENT DOCUMENTS

| | | | | |
|---|---|---|---|---|
| 2007/0173372 | A1* | 7/2007 | Ueno | B60L 7/26 |
| | | | | 477/3 |
| 2007/0222289 | A1* | 9/2007 | Fukuda | B60T 8/1769 |
| | | | | 303/192 |
| 2008/0108477 | A1 | 5/2008 | Noll | |
| 2013/0197773 | A1 | 8/2013 | Shuler | |
| 2013/0261889 | A1* | 10/2013 | Sekine | B60W 50/085 |
| | | | | 701/93 |
| 2014/0277987 | A1 | 9/2014 | Rogalski | |
| 2018/0072322 | A1* | 3/2018 | Ishiguro | B60W 30/143 |
| 2019/0100136 | A1* | 4/2019 | Arai | G08G 1/16 |
| 2019/0375404 | A1* | 12/2019 | Maleki | B60W 40/06 |
| 2020/0031357 | A1* | 1/2020 | Ling | B60L 7/10 |
| 2022/0089024 | A1* | 3/2022 | Aoyama | B60W 50/14 |
| 2023/0090665 | A1* | 3/2023 | Fukukawa | B60W 10/184 |
| | | | | 701/93 |

FOREIGN PATENT DOCUMENTS

| | | | |
|---|---|---|---|
| DE | 10357444 | A1 | 6/2004 |
| DE | 102022105037 | A1 | 10/2022 |
| JP | H07239017 | A * | 9/1995 |
| JP | 2004215465 | A | 7/2004 |
| JP | 2022156179 | A | 10/2022 |

\* cited by examiner

DOWNHILL TARGET SPEED ACCELERATION CONTROL SYSTEMS AND METHODS

TECHNICAL FIELD

The present disclosure relates generally to engine control, and, more particularly, to systems and methods related to downhill target speed acceleration control.

BACKGROUND

When vehicles are traveling in hilly or mountainous terrain, it may be easy for a driver to feel like the vehicle is running away downhill or downgrade, resulting in an undesirable number of brake applications. This can be especially true when towing a trailer or hauling heavy loads. Therefore, a need exists for downhill target speed acceleration control.

BRIEF SUMMARY

Various embodiments of the present disclosure include a method. The method includes detecting a braking behavior to set a target speed of a vehicle to descend downgrade. The method further includes activating a downhill speed control of the vehicle based on the detected braking behavior. The downhill speed control may include applying powertrain torque feedback to limit an acceleration of the vehicle to hold the target speed of the vehicle while descending downgrade.

Various embodiments of the present disclosure include a powertrain torque control system. The powertrain torque control system includes a logic device configured to detect a braking behavior to set a target speed of a vehicle to descend downgrade. The logic device is further configured to activate a downhill speed control of the vehicle based on the detected braking behavior. The downhill speed control may include applying powertrain torque feedback to limit an acceleration of the vehicle to hold the target speed of the vehicle while descending downgrade.

Various embodiments of the present disclosure include a vehicle. The vehicle includes a powertrain and a powertrain torque control system. The powertrain torque control system is configured to detect a braking behavior to set a target speed of the vehicle to descend downgrade. The powertrain torque control system is further configured to activate a downhill speed control of the vehicle based on the detected braking behavior. The downhill speed control may include applying powertrain torque feedback to limit an acceleration of the vehicle to hold the target speed of the vehicle while descending downgrade.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
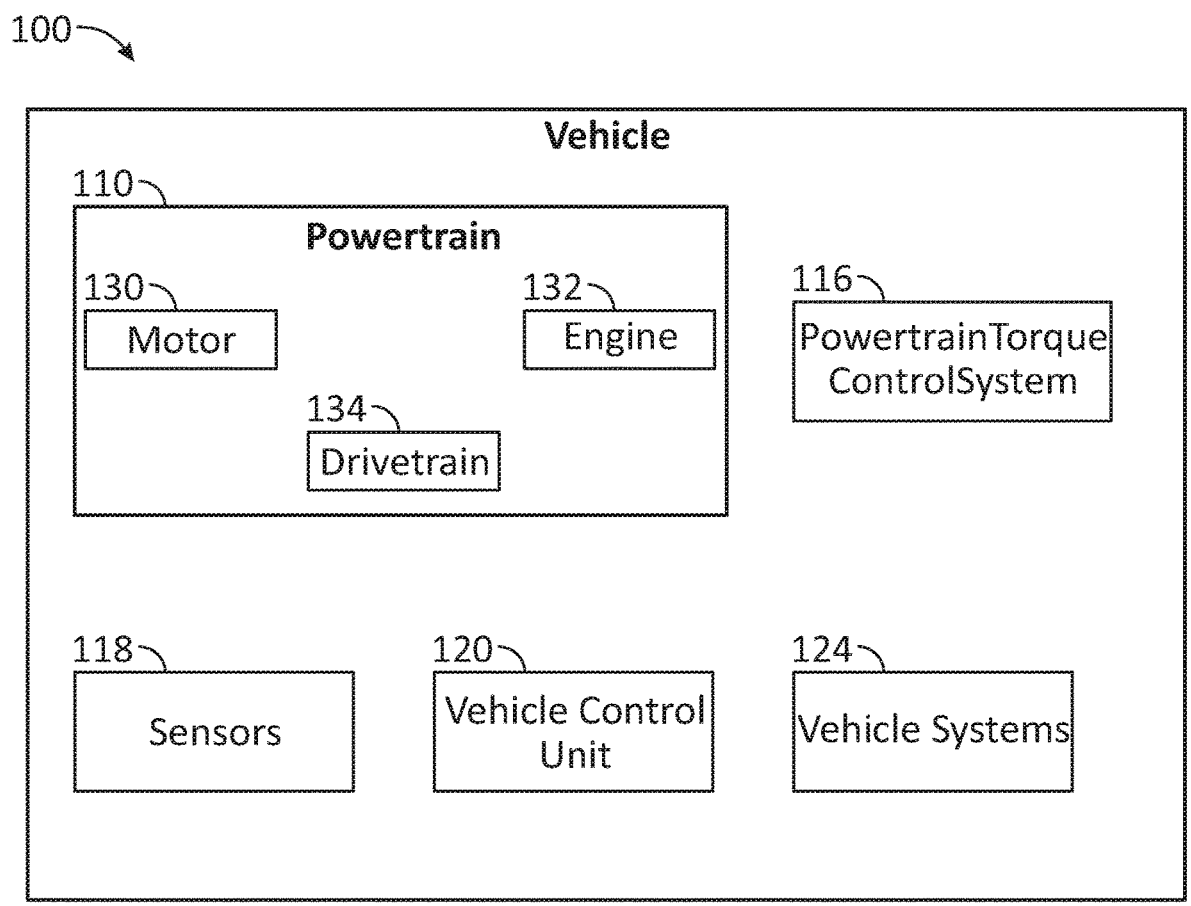
FIG. 1 is a diagram illustrating various systems of a vehicle, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to systems and methods related to downhill target speed acceleration control. For example, a driver of a vehicle may apply the brakes to slow down the vehicle on a downhill road segment. The difference in vehicle speed at brake application to brake release is compared against a threshold. If the difference is greater than the threshold, a target speed for downhill speed control is set based on vehicle speed at brake release. Upon determination of brake release, a display may indicate the downhill speed control is active.

When downhill speed control is active, powertrain torque feedback may be used to limit vehicle acceleration. For example, target speed may be controlled by a torque feedback controller to limit the maximum vehicle acceleration to 0 m/s$^2$, or within a set margin. In embodiments, the downhill speed control may use powertrain torque sweeps (i.e., adjustments) to correct the negative powertrain torque to achieve quick and efficient downhill speed control during changing conditions. In embodiments, the speed of the vehicle may slightly overrun the target speed. However, in some embodiments, no negative torque above a predetermined threshold is applied. In embodiments, the downhill speed control will function only when the vehicle speed exceeds a threshold, the vehicle is not turning (or about to turn), and the vehicle speed is within a threshold of the speed limit, or any other combination thereof.

The downhill speed control may remain active until the driver presses the accelerator pedal for a threshold of time. The threshold of time may be set based on the physical grade of the hill (less downhill creates shorter timer and vice versa). In other embodiments, the downhill speed control can be cancelled by accelerating to a speed over a target speed threshold. If the brakes are applied for a second time on the same downhill road segment, the negative powertrain torque value is saved. In response to the second brake release, the downhill speed control is executed based on the saved negative powertrain torque value.

FIG. 1 is a diagram illustrating various systems of a vehicle 100, according to one or more embodiments of the disclosure. Referring to FIG. 1, vehicle 100 may include a powertrain 110, a powertrain torque control system 116, one or more sensors 118, a vehicle control unit 120, and other vehicle systems 124, among other systems and components. Vehicle 100 may be any type of vehicle, including, for example, a truck, a sport utility vehicle, a crossover utility vehicle, a van, a multipurpose vehicle, a sedan, a hatchback, a wagon, a coupe, a sports car, a convertible, or any other type of vehicle. Vehicle 100 may be an electric vehicle or a vehicle with an internal combustion engine (e.g., a gas-powered vehicle, a diesel-powered vehicle, a hybrid vehicle, etc.), as detailed below. In embodiments, vehicle 100 is not limited to automobiles, and may include a recreational vehicle (RV), an off-highway vehicle (OHV), a side-by-side vehicle, or a golf cart, among other vehicles.

Powertrain 110 is an assembly of every component operable to propel vehicle 100 into motion (e.g., moves vehicle 100 forward or in reverse). For example, powertrain 110 may harness power from a motor 130 and/or an engine 132 and deliver the power to one or more wheels of vehicle 100 via a drivetrain 134. Depending on the application, drivetrain 134 may include a transmission, a driveshaft, one or more axles, and a differential, among other drivetrain components, or any combination thereof.

Motor 130, which may be referred to as a traction motor, may be any suitable electric motor operable to power one or more wheels of vehicle 100. In embodiments, motor 130 may convert direct current (DC) or alternating current (AC) electrical energy into mechanical energy. For example, motor 130 may include an output shaft driven into rotation by induced magnetic fields via DC or AC current. Although a single motor is illustrated in FIG. 1, vehicle 100 may include any number of motors (e.g., multiple motors)

Engine 132 may be an internal combustion engine, although other configurations are contemplated. For example, engine 132 may be a heat engine in which the combustion of a fuel occurs with an oxidizer (e.g., air) in a combustion chamber. An expansion of high-pressure gases produced by the combustion applies a force to some component of the engine 132 (e.g., pistons, blades, rotor, nozzle, etc.), moving the component over a distance, such as to power one or more wheels of vehicle 100.

Powertrain torque control system 116 may utilize various algorithms and decision structures to control the torque applied by powertrain 110, such as during operation of vehicle 100 on a downhill grade. For example, powertrain torque control system 116 may be apply a powertrain torque feedback to limit an acceleration of vehicle 100 to hold the speed of vehicle 100 while descending downgrade, such as to facilitate downhill speed controllability. As detailed more fully below, powertrain torque control system 116 may use driver braking behavior, among other inputs, to determine a target speed of vehicle 100 and use the powertrain torque feedback to achieve a target acceleration (e.g., at or near 0 m/s$^2$) to hold the target speed. In this manner, powertrain torque control system 116 may limit the number of braking applications during downhill driving. In embodiments, powertrain torque control system 116 may account for one or more environmental factors (e.g., speed limit, road conditions, route, etc.) to avoid mis-activation, as described below.

Sensors 118 may include any number and type of sensor supporting operation of vehicle 100 or any other operations described herein (e.g., powertrain torque control feedback). For example, sensors 118 may include an accelerometer, an inertial measurement unit (IMU), a vehicle speed sensor, an engine/motor sensor, a brake sensor, an inclinometer, among other sensors, or any combination thereof.

Vehicle control unit 120 may be any logic device, controller, processor, module, circuitry, or device configured to perform one or more operations. Vehicle control unit 120, which may be referred to as a logic device, may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of vehicle 100, such as powertrain torque control system 116, vehicle systems 124, and/or other elements of vehicle 100, for example. Such software instructions may also implement methods for processing sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 100).

Vehicle control unit 120 may be communicatively connected to powertrain torque control system 116 and vehicle systems 124. Vehicle control unit 120 may be configured to receive data from at least one sensor 118 of vehicle 100. Depending on the application, vehicle control unit 120 may receive and transmit data over wired or wireless communication.

With continued reference to FIG. 1, vehicle 100 may include other components or systems. For example, vehicle systems 124 may include one or more batteries, an onboard charger system, a power control unit, a suspension system, a GPS system, a vehicle dynamics system, a thermal system, a braking system, a steering system, and one or more safety systems. In embodiments, vehicle systems 124 may include various interfaces, controllers, and/or user interfaces.

Figure 2:
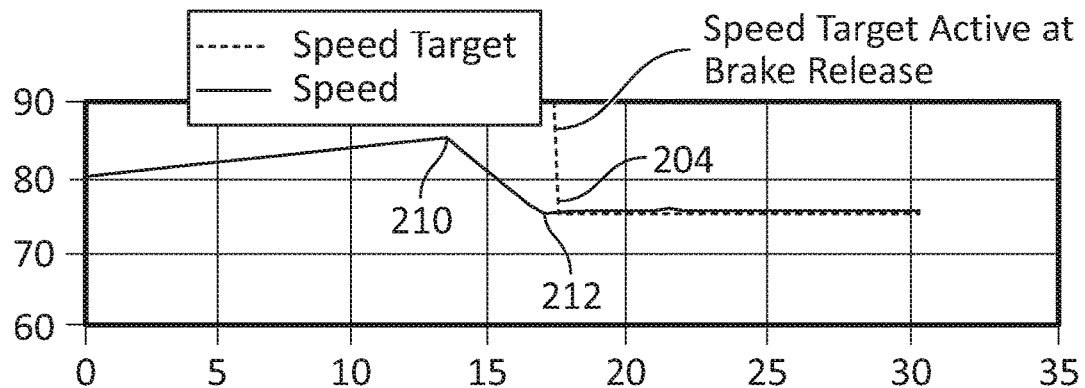
FIG. 2 is a diagram illustrating a plot of vehicle speed over time, according to one or more embodiments of the disclosure.
Figure 3:
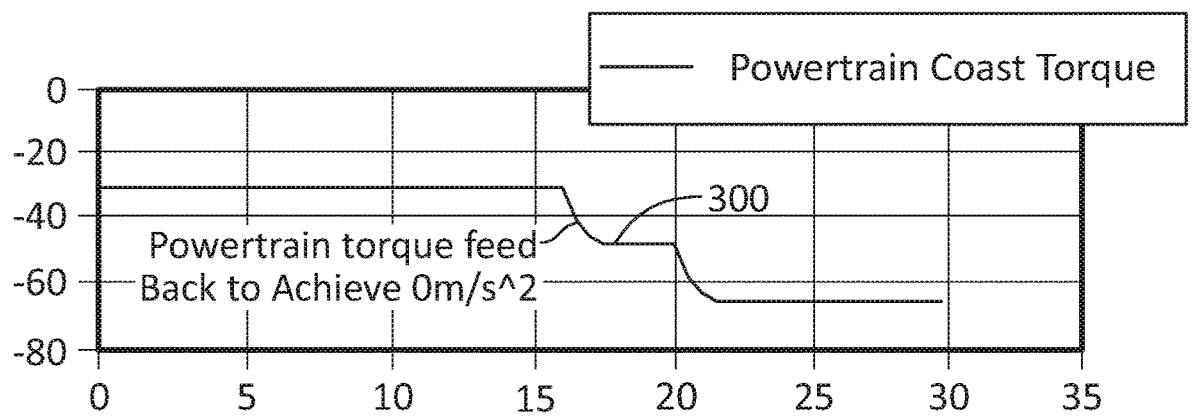
FIG. 3 is a diagram illustrating a plot of powertrain torque over time, according to one or more embodiments of the disclosure.
Figure 4:
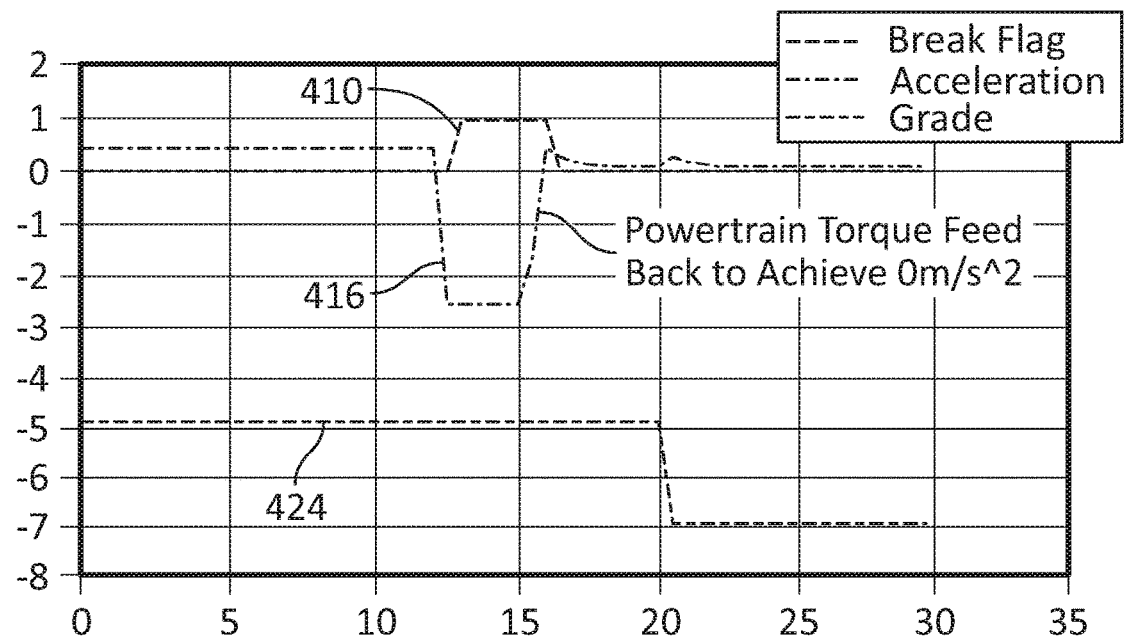
FIG. 4 is a diagram illustrating a plot of vehicle brake input, acceleration, and surface grade over time, according to one or more embodiments of the disclosure.

FIGS. 2-4 illustrate various diagrams of powertrain torque control system 116 in operation. For example, FIG. 2 is a diagram illustrating a plot of vehicle speed over time, according to one or more embodiments of the disclosure. Referring to FIG. 2, powertrain torque control system 116 may detect a braking behavior to set a target speed 204 of vehicle 100 to descend downgrade. As shown, the speed of vehicle 100 may increase (e.g., while descending a hill) until the driver initiates a brake application at a first vehicle speed 210. Applying the brakes to slow down vehicle 100, the speed of vehicle 100 may decrease until the driver releases the brake pedal at a second vehicle speed 212.

The difference between the first vehicle speed 210 and the second vehicle speed 212 may activate a downhill speed control of vehicle 100. For example, if the difference between the first vehicle speed 210 and the second vehicle speed 212 is greater than a speed change threshold, then the downhill speed control of powertrain torque control system 116 may be activated. The speed change threshold may be any number (e.g., 10 kph, greater than 10 kph, or less than 10 kph) that indicates an intention to hold vehicle 100 at a certain speed (e.g., target speed 204). The speed change threshold may be preset (e.g., from the factory during manufacturer of vehicle 100) or adjusted by a user (e.g., vehicle owner, service technician, etc.). If downhill speed control is activated, the target speed 204 may be set to the second vehicle speed 212. For example, the target speed 204 may be active at brake release if the difference between first vehicle speed 210 and second vehicle speed 212 is greater than the speed change threshold at brake release, as shown in FIG. 2. If downhill speed control is activated, a message or indication may be displayed in vehicle 100.

Activation of downhill speed control may be based on other preconditions. For instance, downhill speed control may only be activated when the vehicle speed is greater than a minimum speed threshold (e.g., greater than 40 kph or any other minimum speed threshold). In embodiments, downhill speed control may only be activated when the target speed 204 is within a predetermined range from the posted speed limit (e.g., within 5 kph, 10 kph, 20 kph, etc. from posted speed limit). In embodiments, downhill speed control may not be activated when the detected braking behavior is occurring while turning or in anticipation of an upcoming turn in the road. In embodiments, downhill speed control may only be activated based on a detection of a downhill grade. In this manner, mis-activation of downhill speed control may be avoided.

FIG. 3 is a diagram illustrating a plot of powertrain torque 300 over time, according to one or more embodiments of the disclosure. Referring to FIG. 3, the downhill speed control may include applying powertrain torque feedback to limit vehicle acceleration to hold the target speed 204 of vehicle 100 while descending downgrade. For instance, powertrain torque control system 116 may adjust a negative torque (e.g., a negative coasting torque) applied by powertrain 110 to achieve a target vehicle acceleration at or near 0 m/s$^2$ while descending downgrade. In this manner, powertrain torque control system 116 sets target speed 204, but then vehicle 100 is controlled by the target acceleration. Due to changing conditions (e.g., road grade changes, system changes, etc.), the negative torque applied by powertrain 110 may adjust up or down to achieve the target acceleration, as described below.

FIG. 4 is a diagram illustrating a plot of brake input, vehicle acceleration, and surface grade over time, according to one or more embodiments of the disclosure. Referring to FIG. 4, powertrain torque control system 116 may receive a brake input signal 410. Brake input signal 410 may be used to determine an activation of downhill speed control. For instance, powertrain torque control system 116 may store the first vehicle speed 210 based on a detection of a brake application in brake input signal 410. In like manner, powertrain torque control system 116 may store the second vehicle speed 212 based on a detection of a brake release in brake input signal 410. First and second vehicle speeds 210, 212 may then be processed by powertrain torque control system 116, such as in a manner as detailed above.

With continued reference to FIG. 4, powertrain torque control system 116 may receive a vehicle acceleration signal 416. In the embodiment illustrated in FIG. 4, the vehicle acceleration may be initially positive corresponding to the increase in vehicle speed illustrated in FIG. 2. Once the brakes are applied, the vehicle acceleration quickly drops to a negative acceleration corresponding to the decrease in vehicle speed illustrated in FIG. 2. Once the brakes are released, and the downhill speed control is activated, powertrain torque feedback occurs to achieve a vehicle acceleration at or near 0 m/s$^2$ while descending downgrade.

Referring to FIG. 4, powertrain torque control system 116 may receive a road grade signal 424 (e.g., to detect a downhill grade). As shown, the road grade may change over time, necessitating a change in the negative torque applied by powertrain 110 to achieve a vehicle acceleration at or near 0 m/s$^2$ while descending downgrade. For example, a decrease in road grade may cause vehicle 100 to accelerate and increase speed (e.g., overrunning the target speed 204) for a given negative powertrain torque (see FIG. 2). In such embodiments, powertrain torque control system 116 (e.g., powertrain torque feedback) may increase the negative torque applied by powertrain 110 to slow the vehicle acceleration to 0 m/s$^2$ or approximately 0 m/s$^2$. Depending on the application, powertrain torque control system 116 may slow vehicle 100 back down to the target speed 204, or powertrain torque control system 116 may not create a negative acceleration.

Powertrain torque control system 116 may cause one or more actions if powertrain 110 cannot create enough negative torque to achieve the target acceleration. For example, a message or indication may be displayed in vehicle 100 warning the driver of such a condition. In some embodiments, a transmission downshift may be initiated to meet the powertrain negative torque request. Such examples are illustrative only.

Figure 5:
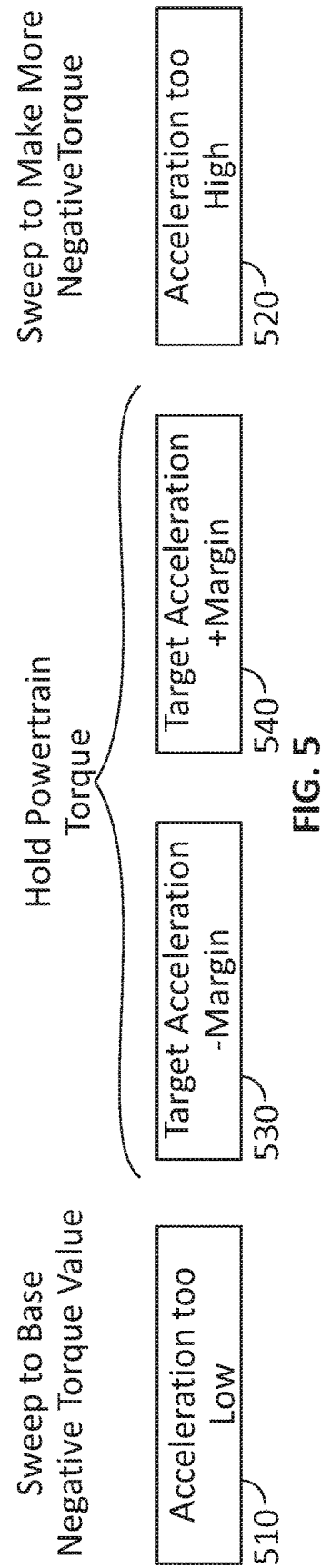
FIG. 5 is a flowchart of a process of determining a powertrain torque request based on vehicle acceleration, according to one or more embodiments of the disclosure.

FIG. 5 is a flowchart of a process of determining a powertrain torque request based on vehicle acceleration, according to one or more embodiments of the disclosure. Referring to FIG. 5, powertrain torque control system 116 may monitor vehicle acceleration (e.g., vehicle acceleration signal 416) and adjust the negative torque provided by powertrain 110 accordingly. In block 510, the vehicle acceleration is too low, such as causing an excessive slowing down of vehicle 100. In such embodiments, powertrain torque control system 116 may adjust powertrain 110 to make less negative torque, such as to a base negative torque value. In block 520, the vehicle acceleration is too high, such as causing vehicle 100 to excessively increase speed. In such embodiments, powertrain torque control system 116 may adjust powertrain 110 to make more negative torque.

In blocks 530 and 540, the vehicle acceleration may be within acceptable margins. For instance, in block 530, the vehicle acceleration may be within a negative margin of target acceleration. In block 540, the vehicle acceleration may be within a positive margin of target acceleration. In such embodiments, powertrain torque control system 116 may hold the current powertrain torque. In this manner, blocks 530 and 540 may define a window for no adjustment to powertrain torque to limit over and under shoot of vehicle acceleration around target acceleration.

Figure 6:
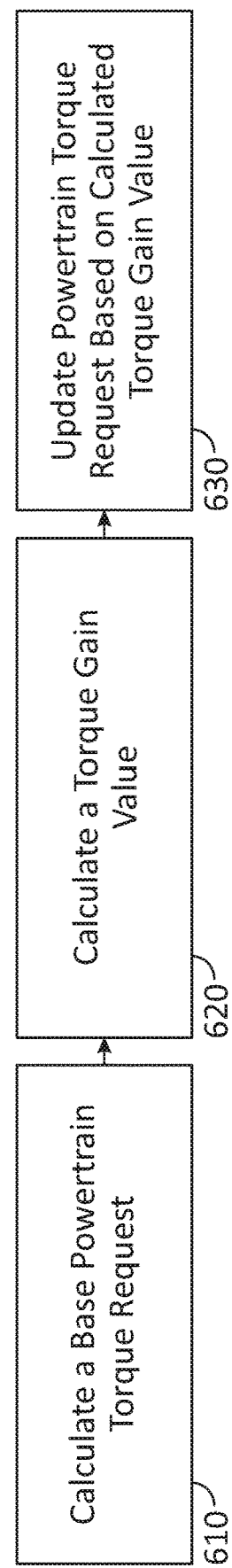
FIG. 6 is a flowchart of a process of updating a powertrain torque request, according to one or more embodiments of the disclosure.

FIG. 6 is a flowchart of a process of updating a powertrain torque request, according to one or more embodiments of the disclosure. In block 610, a base powertrain torque request is calculated. Block 610 may include calculating the base powertrain torque request based on a total mass lookup table, although other configurations are contemplated. The total mass of vehicle 100 may be calculated using various techniques, including those disclosed in U.S. Pat. No. 10,507,820 B2, the disclosure of which is hereby incorporated by reference in its entirety.

In block 620, a torque gain value is calculated, such as to improve the time to achieve target acceleration of vehicle 100. For example, the difference between actual and target torque (e.g., between actual and base powertrain torque request) may be used to identify a torque gain value in a lookup table, although other configurations are contemplated.

In block 630, the powertrain torque request is updated based on the calculated torque gain value. For example, the torque gain value identified or otherwise calculated in block 620 may be applied to the base powertrain torque request calculated in block 610 to update the powertrain torque request. In this manner, the target acceleration of vehicle 100 may be achieved quickly and efficiently and based on real-time or near real-time conditions.

Figure 7:
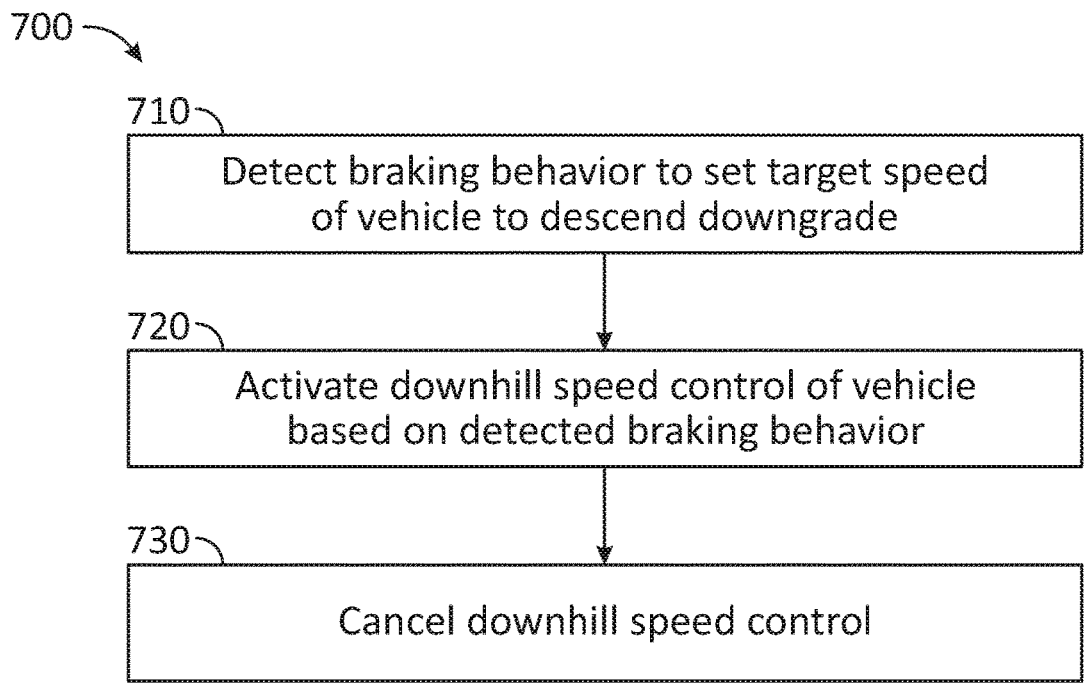
FIG. 7 is a flowchart of a method of controlling downhill acceleration of a vehicle, according to one or more embodiments of the disclosure.

FIG. 7 is a flowchart of a method 700 of controlling downhill acceleration of a vehicle (e.g., vehicle 100), according to one or more embodiments of the disclosure. For explanatory purposes, method 700 is described herein with reference to FIGS. 1-6, although method 700 is not limited to the embodiments illustrated in FIGS. 1-6. Note that one or more operations in FIG. 7 may be combined, omitted, and/or performed in a different order as desired.

In block 710, method 700 includes detecting a braking behavior to set a target speed (e.g., target speed 204) of vehicle 100 to descend downgrade. For example, the driver may apply the brakes to slow down vehicle 100. Block 710 may include detecting the brake application and the associated entry and exit speeds of vehicle 100 during braking. For instance, block 710 may include determining a vehicle speed change between first vehicle speed 210 at a start of a brake application, and second vehicle speed 212 at an end of the brake application. The vehicle speed change may then be compared to a speed change threshold. If the vehicle speed change is greater than or equal to the speed change threshold, the target speed 204 may be set to the second vehicle speed 212. Additionally, or alternatively, the braking behavior may be detected in a manner as described above.

In block 720, method 700 includes activating a downhill speed control of vehicle 100 based on the detected braking behavior. The downhill speed control may be similar to the control described above. For example, the downhill speed control may include applying powertrain torque feedback to limit an acceleration of vehicle 100 to hold the target speed 204 of vehicle 100 while descending downgrade. Block 720 may include activating the downhill speed control based on the vehicle speed change exceeding the speed change threshold. In embodiments, the downhill speed control may be activated based on the target speed 204 being within a predetermined range from a speed limit, as described above. Applying the powertrain torque feedback may include adjusting a powertrain torque to achieve a vehicle acceleration at or near 0 m/s$^2$ while descending downgrade, such as in a manner as described above.

If the brakes are again applied while downhill speed control is active, the same negative powertrain torque value is applied during the brake application. At brake release, the powertrain torque feedback may be updated to set a new target speed or the same target speed, based on vehicle speed at brake release.

In block 730, method 700 may include canceling the downhill speed control. The downhill speed control may be canceled based on at least one of a depressing of an accelerator pedal of the vehicle 100 for longer than a timer, or an acceleration of vehicle 100 to a speed greater than a target speed threshold. When canceling downhill speed control based on depressing the accelerator pedal, block 730 may include detecting a downhill grade (e.g., via road grade signal 424) and setting the timer based on the detected downhill grade. For instance, a smaller downhill grade may create a shorter timer, and vice versa.

Figure 8:
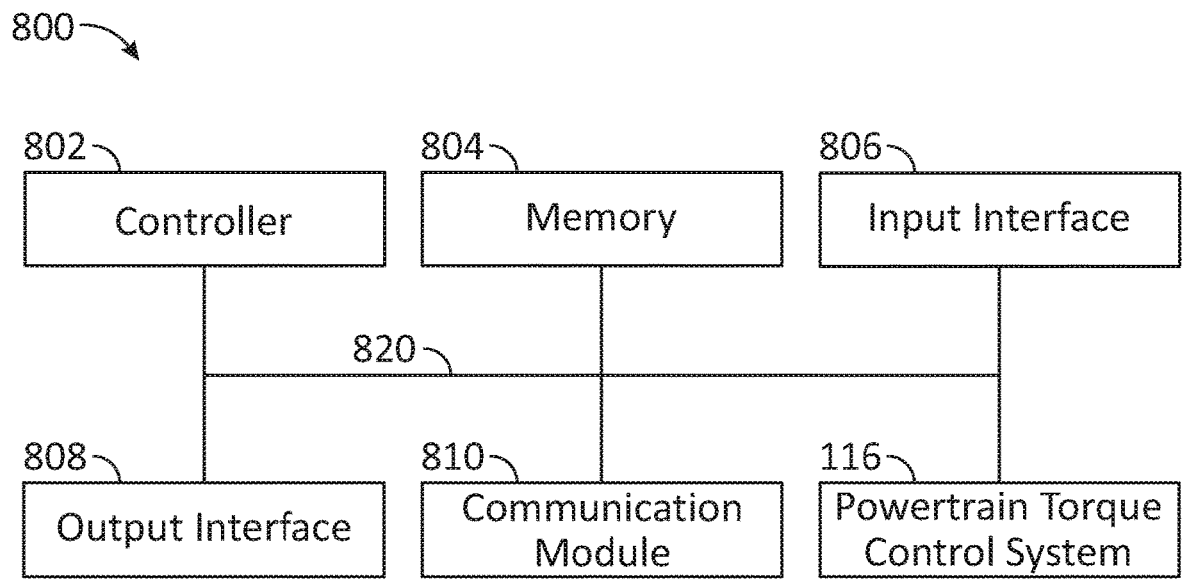
FIG. 8 is a diagram illustrating an example computing or processing system, according to one or more embodiments of the disclosure.

FIG. 8 is a diagram illustrating an example computing or processing system 800 in which embodiments of the present disclosure may be implemented, according to one or more embodiments of the disclosure. For example, powertrain torque control system 116, described above, may be implemented using system 800. In some embodiments, method 700 of FIG. 7, described above, may be implemented using system 800. System 800 can be or include a computer, phone, PDA, tablet, server, controller, or any other type of electronic device. Such an electronic device includes various types of computer readable media and interfaces for various other types of computer readable media. As shown in FIG. 8, system 800 includes a controller 802, a memory 804, an input interface 806, an output interface 808, a communications module 810, and powertrain torque control system 116.

Controller 802, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 802 may be configured to interface and communicate with the various other components of system 800 to perform such operations. For example, controller 802 may be configured to receive and process data received from a network and/or one or more sensors (e.g., sensors 118), store the data in memory 804, and/or retrieve stored data from memory 804.

Controller 802 may include combinations of hardware and software processing functionality and may be provided with/in and/or communicatively attached to other components to execute appropriate instructions, such as software instructions and/or processing parameters stored in memory 804. In various embodiments, controller 802 may be configured to execute software instructions stored in memory 804 to perform various methods, processes, or operations in the manner described herein.

Memory 804 includes, in one embodiment, one or more memory devices configured to store data and information, including magnetic flux data and position information. The memory 804 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, controller 802 may be configured to execute software instructions stored in memory 804 to perform method 300, method 600, and/or method 800 and process steps and/or operations. Controller 802 may be configured to store data in memory 804.

Input interface 806 includes, in one embodiment, a user input and/or an interface device, such as one or more controls, knobs, buttons, slide bars, keyboards, sensors, cameras, and/or other devices, that are adapted to generate an input control signal. Controller 802 may be configured to sense the input control signals from input interface 806 and respond to any sensed input control signals received therefrom. Controller 802 may be configured to interpret such an input control signal as a value, as generally understood by one skilled in the art. In one embodiment, input interface 806 may include a control unit (e.g., a wired or wireless hand-held control unit) having push buttons adapted to interface with a user and receive user input control values. In one implementation, the push buttons of the control unit may be used to control various system functions.

Output interface 808 may enable, for example, the output of data or other information. Output interface 808 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 802 may be configured to render data and information on output interface 808. For example, controller 802 may be configured to render data on output interface 808, such as data stored in memory 804.

In some embodiments, various components of system 800 may be distributed and in communication with one another over a network. In this regard, communications module 810 may be configured to facilitate wired and/or wireless communication among various system components over the network. Such a network may include, for example, a local area network ("LAN"), such as an Intranet, or a wide area network ("WAN"), such as the Internet.

In embodiments, various components of system 800 may be communicatively connected via a system communications bus 820. Bus 820 collectively represents all system, peripheral, and chipset buses that communicatively connect the numerous devices of system 800. For instance, bus 820 may communicatively connect controller 802, memory 804, input interface 806, output interface 808, communications module 810, powertrain torque control system 116, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A method comprising:
   detecting a braking behavior to set a target speed of a vehicle to descend downgrade; and
   activating a downhill speed control of the vehicle based on the detected braking behavior,
   wherein the downhill speed control comprises applying a powertrain torque feedback to limit an acceleration of the vehicle to hold the target speed of the vehicle while descending downgrade; and
   wherein detecting the braking behavior comprises:
      determining a vehicle speed change between a first vehicle speed at a start of a brake application, and a second vehicle speed at an end of the brake application, and
      comparing the vehicle speed change to a speed change threshold, the speed change threshold being a non-zero value; and
   activating the downhill speed control is based on the vehicle speed change exceeding the speed change threshold.

2. The method of claim 1, further comprising canceling the downhill speed control based on at least one of:
   a depressing of an accelerator pedal of the vehicle for longer than a timer; or
   an acceleration of the vehicle to a speed greater than a target speed threshold.

3. The method of claim 2, wherein the canceling the downhill speed control is based on the depressing of the accelerator pedal, the method further comprising:
   detecting a downhill grade; and
   setting the timer based on the detected downhill grade.

4. The method of claim 1, further comprising activating the downhill speed control based on the target speed being within a predetermined range from a posted speed limit.

5. The method of claim 1, wherein the applying the powertrain torque feedback comprises adjusting a powertrain torque to achieve a vehicle acceleration at or near 0 m/s$^2$ while descending downgrade.

6. The method of claim 1, wherein the speed change threshold is preset by a user of the vehicle.

7. A powertrain torque control system comprising:
   a logic device configured to:
      detect a braking behavior to set a target speed of a vehicle to descend downgrade; and
      activate a downhill speed control of the vehicle based on the detected braking behavior,
   wherein the downhill speed control comprises applying a powertrain torque feedback to limit an acceleration of the vehicle to hold the target speed of the vehicle while descending downgrade; and wherein the logic device is configured to:
    determine a vehicle speed change between a first vehicle speed at a start of brake application and a second vehicle speed at an end of the brake application;
    compare the vehicle speed change to a speed change threshold, the speed change threshold being a non-zero value; and
    activate the downhill speed control based on the vehicle speed change exceeding the speed change threshold.

8. The powertrain torque control system of claim 7, wherein the logic device is configured to cancel the downhill speed control based on at least one of:
    a depressing of an accelerator pedal of the vehicle for longer than a timer; or
    an acceleration of the vehicle to a speed greater than a target speed threshold.

9. The powertrain torque control system of claim 8, wherein the logic device is configured to:
    cancel the downhill speed control based on the depressing of the accelerator pedal;
    detect a downhill grade; and
    set the timer based on the detected downhill grade.

10. The powertrain torque control system of claim 7, wherein the logic device is configured to set the speed change threshold to a value preset by a user of the vehicle.

11. The powertrain torque control system of claim 7, wherein the logic device is configured to activate the downhill speed control based on the target speed being within a predetermined range from a posted speed limit.

12. The powertrain torque control system of claim 7, wherein the logic device is configured to adjust a powertrain torque to achieve a vehicle acceleration at or near 0 m/s² while descending downgrade.

13. A vehicle comprising the powertrain torque control system of claim 7.

14. A vehicle comprising:
    a powertrain; and
    a powertrain torque control system configured to:
        detect a braking behavior to set a target speed of the vehicle to descend downgrade, and
        activate a downhill speed control of the vehicle based on the detected braking behavior,
        wherein the downhill speed control comprises applying a powertrain torque feedback to limit an acceleration of the vehicle to hold the target speed of the vehicle while descending downgrade; and
    wherein the powertrain torque control system is configured to:
        determine a vehicle speed change between a first vehicle speed at a start of a brake application and a second vehicle speed at an end of the brake application;
        compare the vehicle speed change to a speed change threshold, the speed change threshold being a non-zero value;
        activate the downhill speed control based on the vehicle speed change exceeding the speed change threshold; and
        set the target speed to the second vehicle speed.

15. The vehicle of claim 14, wherein the powertrain torque control system is configured to adjust a negative torque applied by the powertrain to achieve a vehicle acceleration at or near 0 m/s² while descending downgrade.

16. The vehicle of claim 14, wherein the powertrain torque control system is configured to:
    detect a downhill grade;
    set a pedal timer based on the detected downhill grade; and
    cancel the downhill speed control based on a depressing of an accelerator pedal of the vehicle for longer than the pedal timer.

17. The vehicle of claim 14, wherein the speed change threshold is preset by a user of the vehicle.

18. The vehicle of claim 14, wherein the powertrain torque control system is configured to activate the downhill speed control based on the target speed being within a predetermined range from a posted speed limit.

* * * * *